US011241840B2

(12) United States Patent
Watanabe

(10) Patent No.: US 11,241,840 B2
(45) Date of Patent: Feb. 8, 2022

(54) QUALITY DETERMINATION METHOD FOR THREE-DIMENSIONAL SHAPED OBJECT AND THREE-DIMENSIONAL SHAPING DEVICE

(71) Applicant: SEIKO EPSON CORPORATION, Tokyo (JP)

(72) Inventor: Manabu Watanabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 104 days.

(21) Appl. No.: 16/854,318

(22) Filed: Apr. 21, 2020

(65) Prior Publication Data

US 2020/0338831 A1   Oct. 29, 2020

(30) Foreign Application Priority Data

Apr. 24, 2019  (JP) .............................. JP2019-082721

(51) Int. Cl.
| | |
|---|---|
| *B29C 64/393* | (2017.01) |
| *B29C 64/209* | (2017.01) |
| *B29C 64/165* | (2017.01) |
| *B29C 64/227* | (2017.01) |
| *B33Y 50/02* | (2015.01) |
| *B33Y 10/00* | (2015.01) |
| *B33Y 30/00* | (2015.01) |

(52) U.S. Cl.
CPC .......... *B29C 64/393* (2017.08); *B29C 64/165* (2017.08); *B29C 64/209* (2017.08); *B29C 64/227* (2017.08); *B33Y 10/00* (2014.12); *B33Y 30/00* (2014.12); *B33Y 50/02* (2014.12)

(58) Field of Classification Search
CPC ... B29C 64/393; B29C 64/209; B29C 64/227; B33Y 10/00; B33Y 30/00; B33Y 50/02
See application file for complete search history.

(56) References Cited

U.S. PATENT DOCUMENTS

| | | | |
|---|---|---|---|
| 2005/0237357 A1 | 10/2005 | Usuda | |
| 2016/0236414 A1* | 8/2016 | Reese | .................... B33Y 50/02 |
| 2017/0095980 A1* | 4/2017 | Kritchman | ............. B33Y 30/00 |

(Continued)

FOREIGN PATENT DOCUMENTS

| | | |
|---|---|---|
| CN | 1689817 | 3/2008 |
| CN | 105058801 | 11/2015 |

(Continued)

*Primary Examiner* — Yung-Sheng M Tsui
(74) *Attorney, Agent, or Firm* — Workman Nydegger

(57) ABSTRACT

A quality determination method for a three-dimensional shaped object includes: a shaping step of shaping a plurality of three-dimensional shaped objects by discharging a liquid from a nozzle hole toward a stage while changing a relative position between a discharge unit having a plurality of the nozzle holes arranged along a first direction and the stage in a second direction intersecting the first direction; a discharge inspection step of inspecting a discharge state of the liquid from the nozzle hole after or during the shaping step; and a quality determination step of determining that, when an abnormality is detected in the discharge state from at least one nozzle hole of the plurality of nozzle holes in the discharge inspection step, a low-quality three-dimensional shaped object is included in the plurality of shaped three-dimensional shaped objects.

6 Claims, 7 Drawing Sheets

(56) References Cited

U.S. PATENT DOCUMENTS

| | | | |
|---|---|---|---|
| 2018/0009167 A1* | 1/2018 | Alejandre | B33Y 50/02 |
| 2018/0086000 A1* | 3/2018 | Sanchez Ribes | B29C 64/165 |
| 2018/0207859 A1* | 7/2018 | Ochi | B29C 64/393 |
| 2018/0361672 A1* | 12/2018 | Ochi | B29C 64/112 |
| 2019/0030900 A1* | 1/2019 | Iwase | B41J 11/002 |
| 2019/0099953 A1* | 4/2019 | MacNeish, III | B29C 64/393 |

FOREIGN PATENT DOCUMENTS

| | | | |
|---|---|---|---|
| CN | 105965894 | 9/2016 | |
| JP | 2017-189885 A | 10/2017 | |
| JP | 2019-006078 A | 1/2019 | |
| WO | 2016/042610 A | 3/2016 | |
| WO | WO-2017067575 A1 * | 4/2017 | B33Y 10/00 |

* cited by examiner

QUALITY DETERMINATION METHOD FOR THREE-DIMENSIONAL SHAPED OBJECT AND THREE-DIMENSIONAL SHAPING DEVICE

The present application is based on, and claims priority from JP Application Serial Number 2019-082721, filed Apr. 24, 2019, the disclosure of which is hereby incorporated by reference herein in its entirety.

BACKGROUND

1. Technical Field

The present disclosure relates to a quality determination method for a three-dimensional shaped object and a three-dimensional shaping device.

2. Related Art

For example, JP-A-2019-006078 discloses a technique for shaping a three-dimensional shaped object in which cross-sectional layers are stacked by, after forming a powder layer, shaping a cross-sectional layer by discharging a liquid binder toward a predetermined region of the powder layer from a plurality of nozzle holes provided in a head moving along the powder layer, and by repeating the formation of the powder layer and the discharge of the binder toward the shaped cross-sectional layer.

Using the above-described technique, a plurality of three-dimensional shaped objects can be shaped at once. For example, by discharging the binder from the plurality of nozzle holes provided along a direction intersecting a moving direction of the head, a plurality of three-dimensional shaped objects arranged in the direction intersecting the moving direction of the head can be shaped at once. However, in this case, when the binder is not normally discharged from a part or all of the nozzle holes, a low-quality three-dimensional shaped object may be included in a plurality of shaped three-dimensional shaped objects. It requires time and effort to determine whether a low-quality three-dimensional shaped object is included in the plurality of three-dimensional shaped objects. This problem is not limited to a binder injection type for shaping the three-dimensional shaped object by discharging the liquid binder from the nozzle hole as described above, but is also common to a material injection type for shaping the three-dimensional shaped object by discharging a liquid material from the nozzle hole.

SUMMARY

According to one aspect of the present disclosure, a quality determination method for a three-dimensional shaped object is provided. The quality determination method for a three-dimensional shaped object includes: a shaping step of shaping a plurality of three-dimensional shaped objects by discharging a liquid from a nozzle hole toward a stage while changing a relative position between a discharge unit having a plurality of the nozzle holes arranged along a first direction and the stage in a second direction intersecting the first direction; a discharge inspection step of inspecting a discharge state of the liquid from the nozzle hole after or during the shaping step; and a quality determination step of determining that, when an abnormality is detected in the discharge state from at least one nozzle hole of the plurality of nozzle holes in the discharge inspection step, a low-quality three-dimensional shaped object is included in the plurality of shaped three-dimensional shaped objects.

DESCRIPTION OF EXEMPLARY EMBODIMENTS

A. First Embodiment

Figure 1:
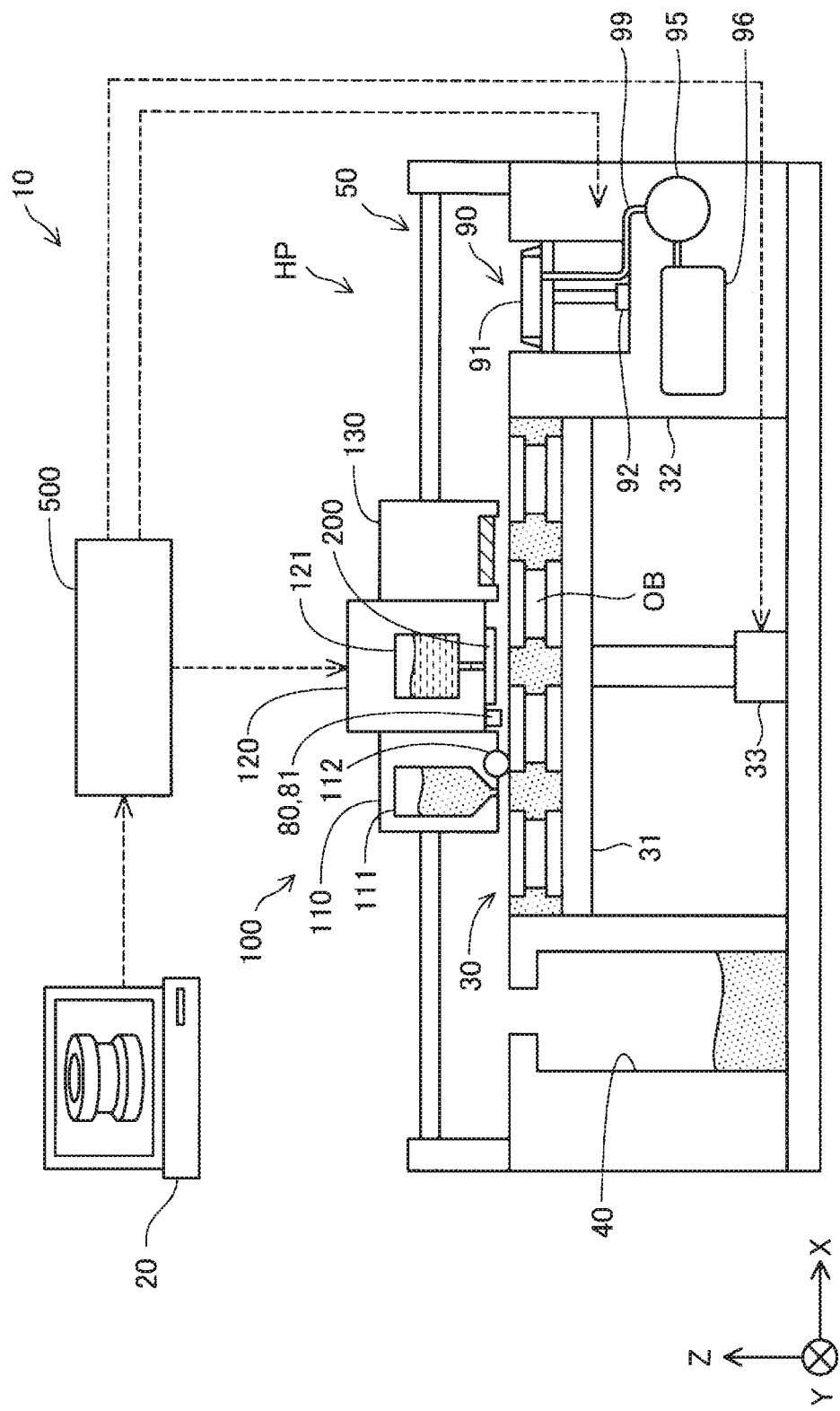
FIG. 1 is a first diagram showing a schematic configuration of a three-dimensional shaping device according to a first embodiment.

FIG. 1 is a first diagram showing a schematic configuration of a three-dimensional shaping device 10 according to a first embodiment. FIG. 1 schematically represents the three-dimensional shaping device 10 viewed from a side and a three-dimensional shaped object OB shaped by the three-dimensional shaping device 10. In FIG. 1, arrows along X, Y, and Z directions which are orthogonal to each other are represented. An X direction and a Y direction are directions along a horizontal direction and a Z direction is a direction along a vertical direction. In other figures, the arrows along the X, Y, and Z directions are represented as appropriate. The X, Y, Z directions in FIG. 1 and the X, Y, Z directions in other figures represent the same direction. The Y direction may be referred to as a first direction, the X direction may be referred to as a second direction, and the Z direction may be referred to as a third direction.

The three-dimensional shaping device 10 includes a shaping tank unit 30, a shaping unit 100, a moving mechanism 50, and a control unit 500. An information processing device 20 is coupled to the control unit 500. The three-dimensional shaping device 10 and the information processing device 20 can be together regarded as a three-dimensional shaping device in a broad sense.

The control unit 500 is implemented by a computer including one or more processors, a main storage device, and an input and output interface for inputting and outputting signals to and from an outside. In the present embodiment, the control unit 500 executes a shaping processing for shaping the three-dimensional shaped object OB, which will be described later, by causing the processor to execute a program or a command read into the main storage device. The control unit 500 may be implemented by a combination of a plurality of circuits instead of the computer.

The shaping tank unit 30 is a tank-shaped structure in which the three-dimensional shaped object OB is shaped.

The shaping tank unit 30 includes a planar stage 31 along an XY direction, a frame 32 surrounding an outer periphery of the stage 31, and a lifting mechanism 33 for moving the stage 31 along the Z direction. The stage 31 is moved along the Z direction in the frame 32 by the lifting mechanism 33. In the present embodiment, the lifting mechanism 33 is implemented by an actuator that moves the stage 31 along the Z direction under a control of the control unit 500.

The moving mechanism 50 is provided above the shaping tank unit 30. The moving mechanism 50 changes a relative position between the shaping unit 100 and the stage 31 along the X direction. In the present embodiment, the moving mechanism 50 is implemented by an actuator that moves the shaping unit 100 along the X direction under the control of the control unit 500. The moving mechanism 50 may be configured to change the relative position between the shaping unit 100 and the stage 31 along the X direction by moving the stage 31, or may be configured to change the relative position between the shaping unit 100 and the stage 31 along the X direction by moving both the shaping unit 100 and the stage 31.

The shaping unit 100 is provided above the shaping tank unit 30 by being supported by the moving mechanism 50. In the present embodiment, the shaping unit 100 includes a powder layer forming unit 110, a discharge unit 120, and a curing energy supply unit 130. In the shaping unit 100, while the stage 31 is moved along the X direction, a powder layer is formed on the stage 31 by using the powder layer forming unit 110, a binder liquid, which is a liquid containing a binder, is discharged to the powder layer by using the discharge unit 120 to form a shaped layer, and the binder is cured by using the curing energy supply unit 130. When the shaping unit 100 repeats the above-described operations, the three-dimensional shaped object OB in which shaped layers are stacked is shaped. The shaped layer is a portion corresponding to one layer of the three-dimensional shaped object OB.

The powder layer means a layer in which powder that is a powdery material of the three-dimensional shaped object OB is spread. As the powder, for example, various materials such as a metal material, a ceramic material, a resin material, a composite material, wood, rubber, leather, carbon, glass, a biocompatible material, a magnetic material, gypsum, and sand can be used. One type of these materials may be used as the powder, or two or more types may be used in combination as the powder. In the present embodiment, powdery stainless steel is used as the powder.

The binder has a function of binding the powder. The binder bonds not only the powder in the same shaped layer but also the powder spread on the shaped layer and the shaped layer. Therefore, adjacent shaping layers are bonded to each other by the binder. As the binder, for example, a thermoplastic resin, a thermosetting resin, various types of photocurable resins such as a visible light curable resin that is cured by light in a visible light region, an ultraviolet curable resin, and an infrared curable resin, and an X-ray curable resin can be used. One type of these binders may be used as the binder, or two or more types may be used in combination as the binder. In the present embodiment, a thermosetting resin binder is used.

The powder layer forming unit 110 includes a powder supply unit 111 and a flattening unit 112. The powder supply unit 111 supplies the powder onto the stage 31. In the present embodiment, the powder supply unit 111 is implemented by a hopper in which the powder is stored. The flattening unit 112 flattens the powder supplied from the powder supply unit 111 while the stage 31 is moved along the X direction, to form a powder layer on the stage 31. The powder extruded from the stage 31 by the flattening unit 112 is discharged into a powder collection unit 40 provided adjacent to the shaping tank unit 30. In the present embodiment, the flattening unit 112 is implemented by a roller. The flattening unit 112 may be implemented by a squeegee.

The discharge unit 120 includes a liquid supply unit 121 and a line head 200. The liquid supply unit 121 supplies the binder liquid to the line head 200. In the present embodiment, the liquid supply unit 121 is implemented by a tank in which the binder liquid is stored. The line head 200 discharges the binder liquid supplied from the liquid supply unit 121 toward the powder layer formed on the stage 31 while the stage 31 is moved along the X direction. A more specific configuration of the discharge unit 120 will be described below with reference to FIG. 2.

The curing energy supply unit 130 applies energy for curing the binder with respect to the binder contained in the binder liquid discharged from the discharge unit 120 to the powder layer. In the present embodiment, the curing energy supply unit 130 is implemented by a heater. In the present embodiment, since a thermosetting binder is used, the curing energy supply unit 130 cures the binder by heating with the heater. When a photocurable binder is used, the curing energy supply unit 130 may be configured to cure the binder by emitting light corresponding to the binder. For example, when an ultraviolet curable binder is used, the curing energy supply unit 130 may be implemented by an ultraviolet lamp.

Figure 2:
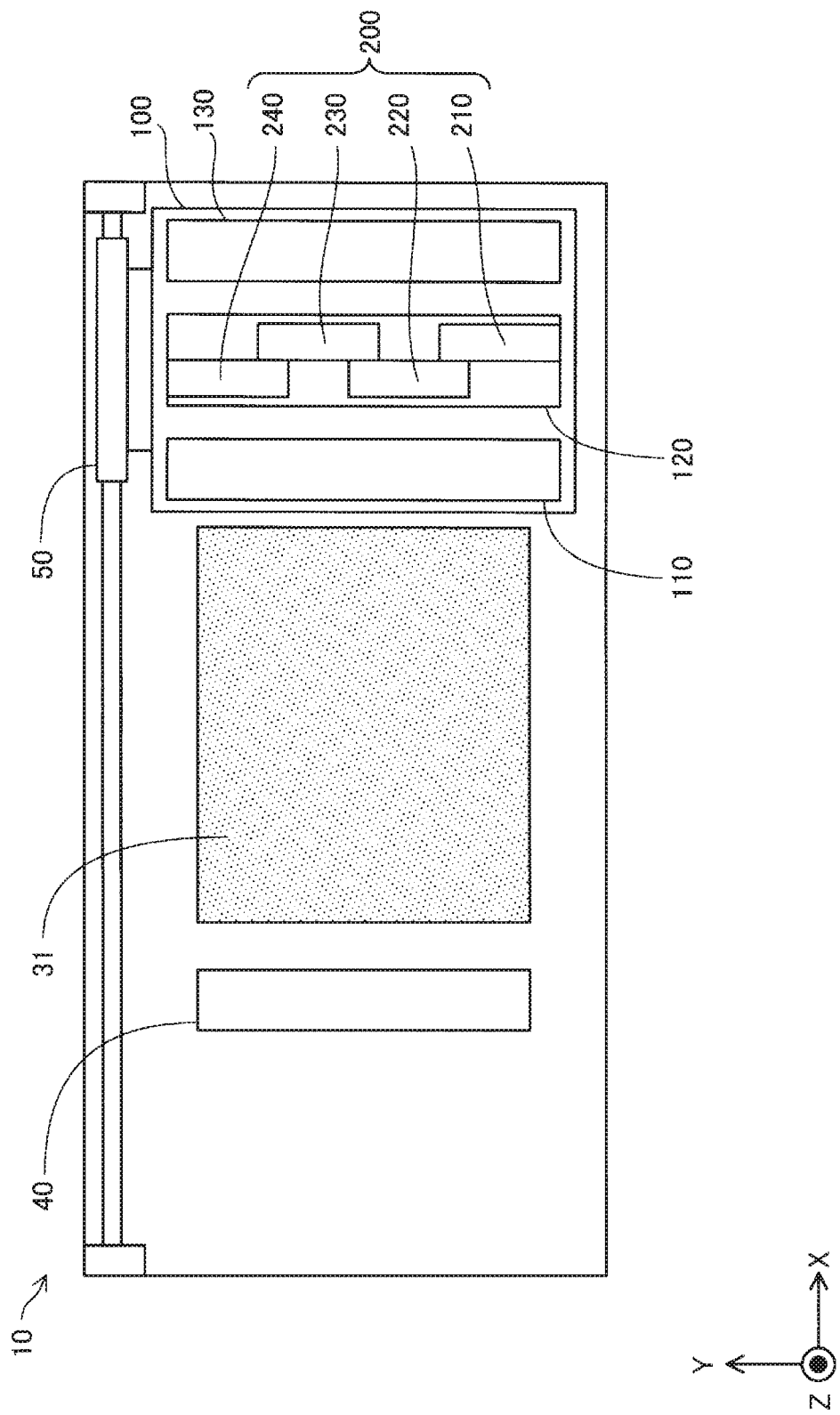
FIG. 2 is a second diagram showing a schematic configuration of the three-dimensional shaping device according to the first embodiment.

FIG. 2 is a second diagram showing a schematic configuration of the three-dimensional shaping device 10 according to the first embodiment. FIG. 2 schematically represents the three-dimensional shaping device 10 as viewed from above. A specific configuration of the discharge unit 120 will be described with reference to FIG. 2. In the present embodiment, as described above, the line head 200 is provided in the discharge unit 120.

The line head 200 has a length substantially equal to a length of the stage 31 in the Y direction. In the present embodiment, the line head 200 is configured by connecting a plurality of liquid discharge heads. Each liquid discharge head is implemented by a piezo drive liquid discharge head. In the piezo drive liquid discharge head, a pressure chamber provided with fine nozzle holes is previously filled with the binder liquid, and a piezo element is used to bend a side wall of the pressure chamber, so that it is possible to discharge the binder liquid having a volume corresponding to a volume reduction of the pressure chamber as a droplet. A nozzle hole may be referred to as a nozzle.

In the present embodiment, the line head 200 is configured by coupling four liquid discharge heads along the Y direction. The liquid discharge heads are referred to as a first head 210, a second head 220, a third head 230, and a fourth head 240 in an order from an end portion of the line head 200 on a −Y direction side. Among the heads 210 to 240, the adjacent heads are partially overlapped and coupled in the X direction. The line head 200 may be configured by coupling two or three liquid discharge heads along the Y direction, or may be configured by coupling five or more liquid discharge heads along the Y direction. The line head 200 may be configured with one liquid discharge head.

Figure 3:
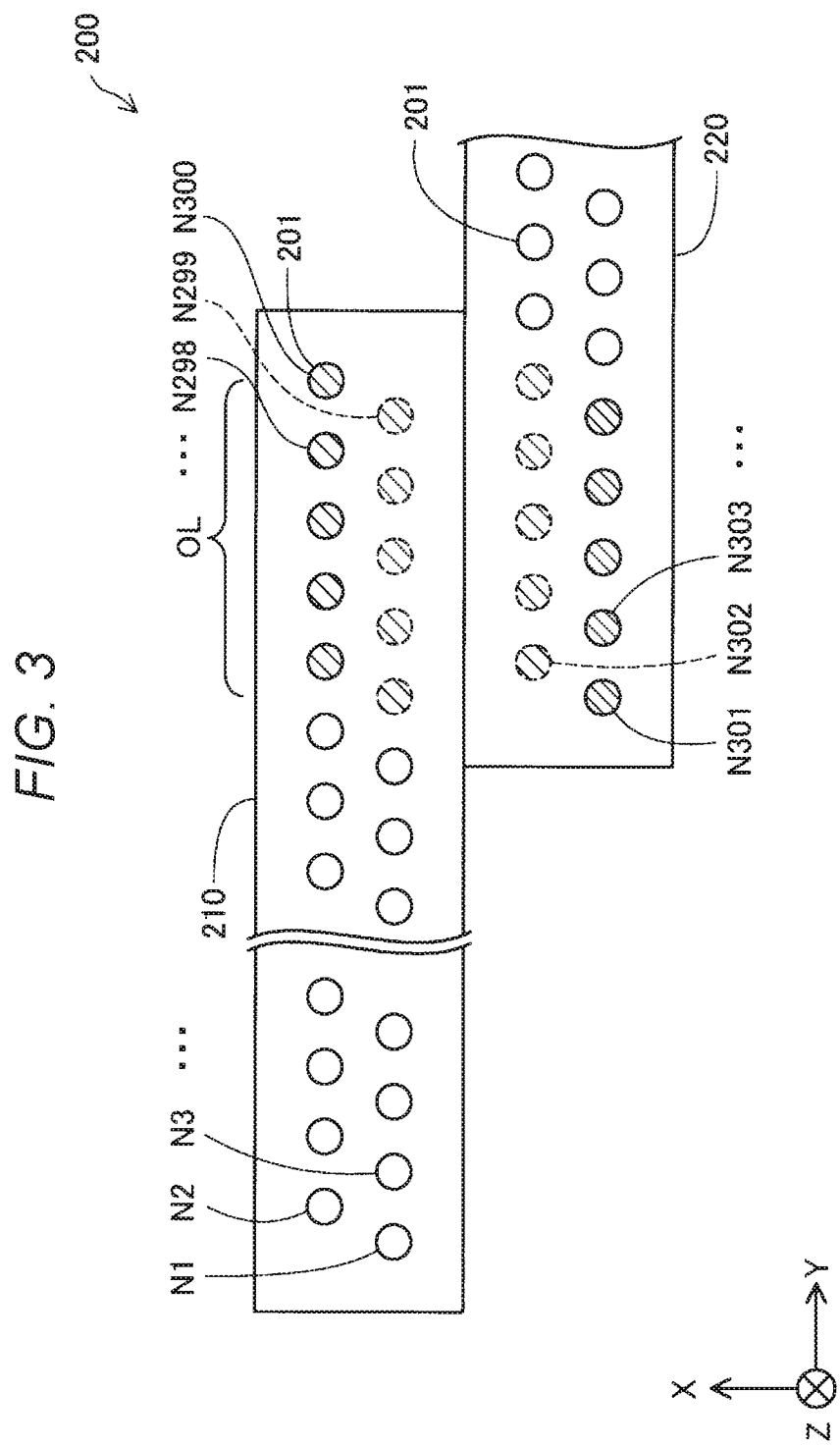
FIG. 3 is a diagram showing an arrangement of nozzle holes in a line head.

FIG. 3 is a diagram showing an arrangement of nozzle holes 201 in the line head 200. FIG. 3 shows a coupling portion between the first head 210 and the second head 220 in the line head 200 as viewed from below. The line head 200 has an overlap portion OL at the coupling portion between the first head 210 and the second head 220. The overlap portion OL means a region where portions provided with the nozzle holes 201 overlap in the X direction between the adjacent heads 210 and 220. In FIG. 3, the nozzle holes 201 disposed in the overlap portion OL are hatched. In FIG. 3, nozzles for use described later are represented by solid lines, and nozzles not for use are represented by broken lines. A coupling portion between the second head 220 and the third head 230 and a coupling portion between the third head 230 and the fourth head 240 also have overlap portions, similarly to the coupling portion between the first head 210 and the second head 220 described above.

In the present embodiment, on a lower surface of the heads 210 to 240, a plurality of nozzle holes 201 for discharging the binder liquid as a droplet are provided in a staggered arrangement. That is, on the lower surface of the heads 210 to 240, two parallel nozzle rows each including a plurality of nozzle holes 201 arranged at equal intervals are provided. The nozzle rows are arranged to be shifted from each other along a direction in which the nozzle holes 201 are disposed. A magnitude of this shift is the same as half a distance between the nozzle holes 201 in the same nozzle row. In the present embodiment, each nozzle row is arranged along the Y direction. In the overlap portion OL, the nozzles for use and the nozzles not for use are set by a mask processing described later such that droplets are not discharged from both heads 210 and 220 to the same position in an overlapping manner.

With reference to FIG. 1, the shaping unit 100 is provided with a discharge inspection unit 80 configured to detect an abnormality of a discharge state of the droplet from the nozzle hole 201. The abnormality of the discharge state means that an intended droplet is not discharged from the nozzle hole 201 due to, for example, mixing of bubbles into the liquid discharge head or thickening of the liquid in the liquid discharge head. This abnormality of the discharge state may be referred to as clogging of the nozzle hole 201. In the present embodiment, the discharge inspection unit 80 is configured with a camera 81 provided on the shaping unit 100. The camera 81 captures an image of the droplet when being discharged from the nozzle hole 201. The image captured by camera 81 is transmitted to the control unit 500. The control unit 500 analyzes the transmitted image to determine the abnormality of the discharge state of droplet from each nozzle hole 201. The camera 81 may be provided on, for example, the frame 32 instead of the shaping unit 100 as long as the camera 81 can detect the abnormality of the discharge state. Instead of the camera 81, the discharge inspection unit 80 may be configured with a light emitting element that emits laser light and a light receiving element that receives the laser light. In this case, by discharging the droplet from the nozzle hole 201 so as to pass the droplet between the light emitting element that emits the laser light and the light receiving element, and measuring a change in an electric signal output by the light receiving element at that time, it is possible to detect the abnormality of the discharge state. As the discharge inspection unit 80, a piezoelectric element included in the liquid discharge head may be used. In this case, by measuring a residual vibration generated by the piezoelectric element in the pressure chamber along with the discharge of the droplet from the nozzle hole 201, it is possible to detect the abnormality of the discharge state.

A home position HP of the shaping unit 100 is provided on a +X direction side of the stage 31. In the frame 32 below the home position HP, a suction unit 90 configured to suck the liquid in the nozzle hole 201 is provided. In the present embodiment, the suction unit 90 includes a head cap 91, a cap lifting mechanism 92, a suction pump 95, and a waste liquid tank 96. A tube 99 is coupled between the head cap 91 and the suction pump 95 and between the suction pump 95 and the waste liquid tank 96. The head cap 91 is lifted up and down along the Z direction by the cap lifting mechanism 92 to cover a surface of the line head 200 where the nozzle holes 201 are provided. The cap lifting mechanism 92 is implemented by an actuator that moves the head cap 91 along the Z direction under the control of the control unit 500. The suction pump 95 generates a negative pressure in the head cap 91 to suck the liquid from the nozzle hole 201. The liquid sucked from the nozzle hole 201 is stored in the waste liquid tank 96.

Figure 4:
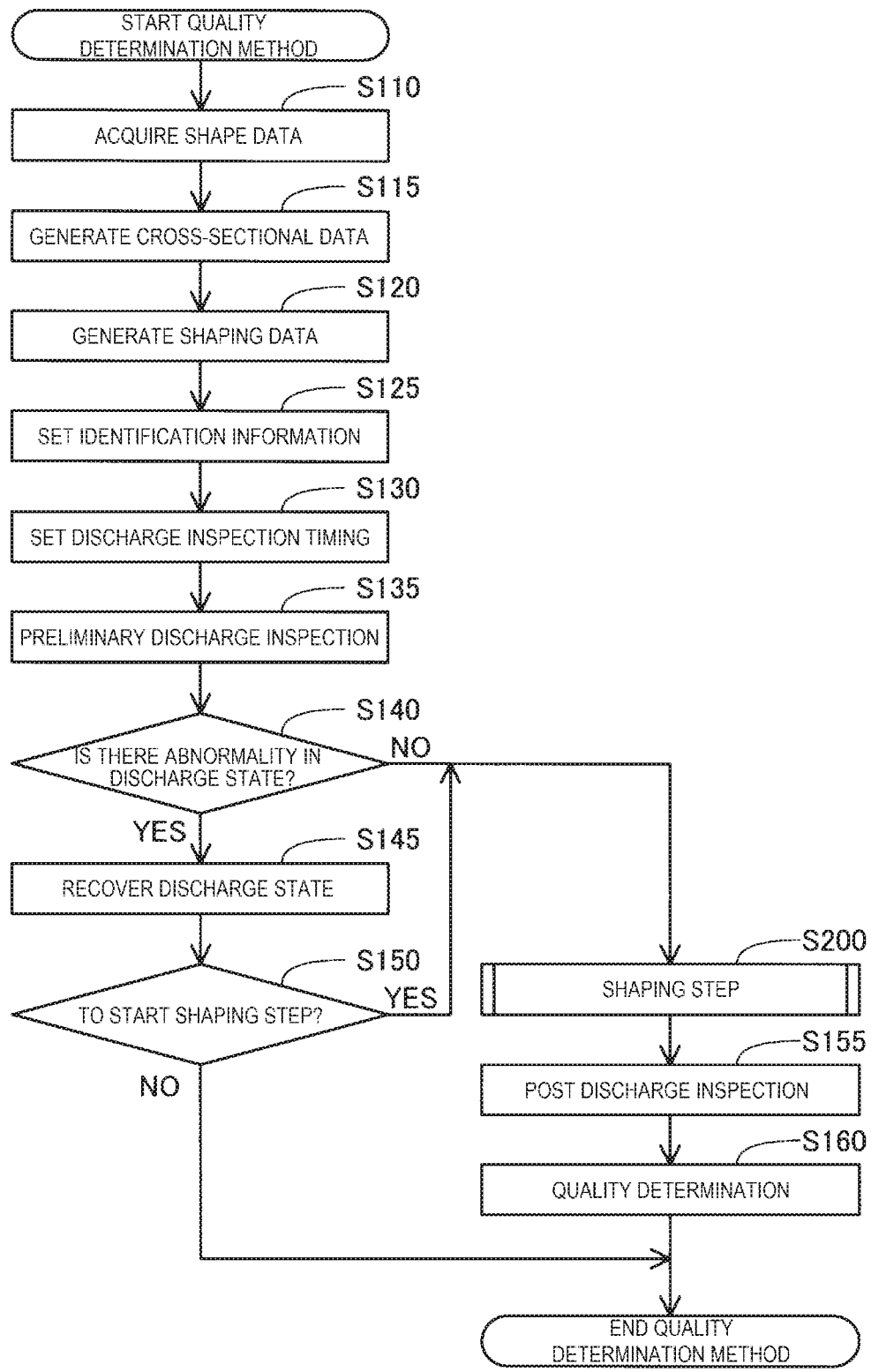
FIG. 4 is a flowchart showing contents of a processing of a quality determination method according to the first embodiment.

FIG. 4 is a flowchart showing contents of a processing of a quality determination method for the three-dimensional shaped object OB according to the present embodiment. This processing is executed by the control unit 500 when a predetermined start operation is performed, by a user, on an operation panel provided in the three-dimensional shaping device 10 or on the information processing device 20 coupled to the three-dimensional shaping device 10.

In step S110, the control unit 500 acquires shape data representing shapes of a plurality of three-dimensional shaped objects OBs. This step is also referred to as a shape data acquisition step. As the shape data, for example, data created using three-dimensional CAD software or three-dimensional CG software and output in an STL format, an IGES format, or a STEP format can be used. In the present embodiment, the control unit 500 acquires the shape data from the information processing device 20 coupled to the three-dimensional shaping device 10. The control unit 500 may acquire the shape data via a recording medium such as a USB memory.

Figure 5:
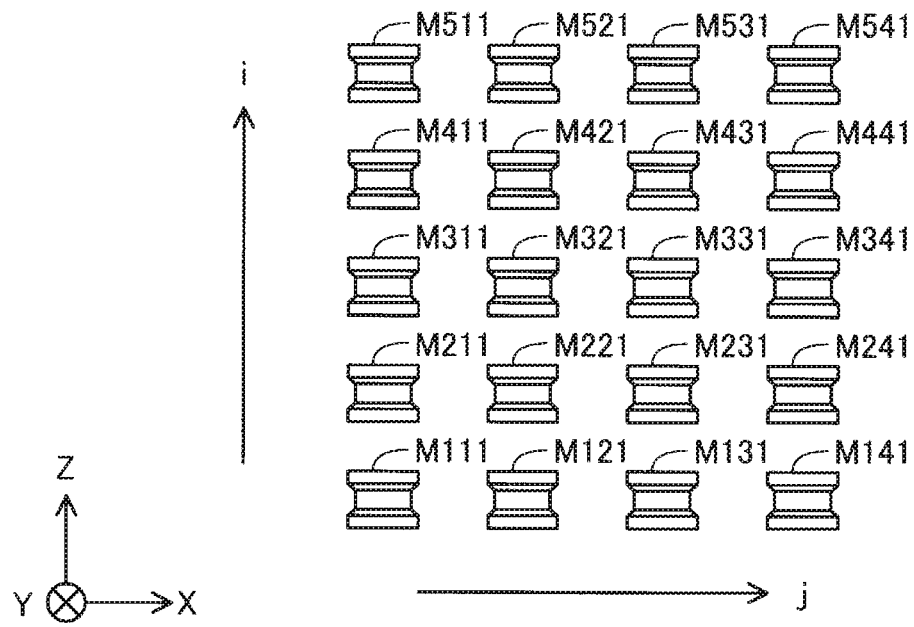
FIG. 5 is a first diagram showing an arrangement of three-dimensional shaped objects represented by shape data.
Figure 6:
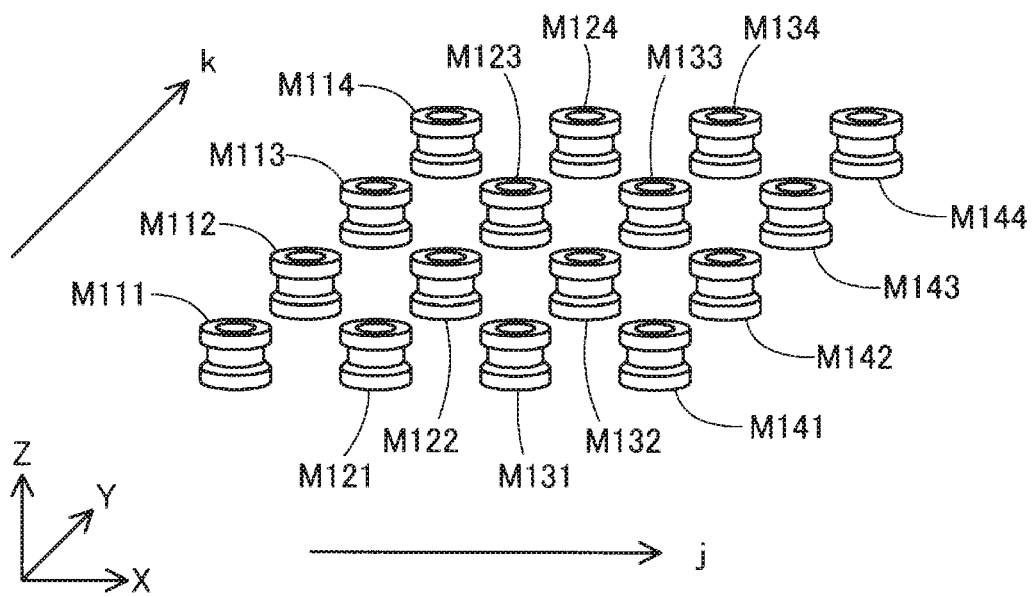
FIG. 6 is a second diagram showing the arrangement of the three-dimensional shaped objects represented by the shape data.

FIG. 5 is a first diagram showing an arrangement of the three-dimensional shaped objects represented by the shape data according to the present embodiment. FIG. 6 is a second diagram showing the arrangement of the three-dimensional shaped objects OBs represented by the shape data according to the present embodiment. In the present embodiment, for the shape data, the three-dimensional shaped objects OBs are arranged in five layers along the Z direction, four rows in the X direction, and four columns in the Y direction. That is, 80 three-dimensional shaped objects OBs are represented by the shape data. Each three-dimensional shaped object OB has the same shape. The three-dimensional shaped objects OBs are arranged at equal intervals. The control unit 500 may acquire shape data representing only one three-dimensional shaped object OB, and may use the acquired shape data to generate shape data in which a plurality of three-dimensional shaped objects OBs having the same shape are arranged at equal intervals as represented in FIGS. 5 and 6.

With reference to FIG. 4, in step S115, the control unit 500 uses the acquired shape data to generate cross-sectional data of the plurality of three-dimensional shaped objects OBs. This step is also referred to as a cross-section data generation step. The control unit 500 cuts the shapes of the plurality of three-dimensional shaped objects OBs at intervals according to a thickness of one layer of the three-dimensional shaped object OB shaped on the stage 31, and generates a plurality of cross-sectional data. The control unit 500 cuts the plurality of three-dimensional shaped objects OBs on a plane perpendicular to the Z direction.

In step S120, the control unit 500 uses the generated cross-sectional data to generate shaping data used for shaping the three-dimensional shaped object OB. This step is also referred to as a shaping data generation step. First, the control unit 500 uses the generated cross-sectional data to generate dot data for each layer, which represents an amount of droplets to be discharged with respect to coordinates in the X direction and the Y direction. Next, the control unit 500 generates line data in which the dot data for each layer is rearranged according to a formation order by the line head 200. After that, the control unit 500 performs the mask processing using the generated line data and a mask pattern stored previously, thereby generating shaping data used when the droplets are discharged from the heads 210 to 240. The mask processing is a processing of setting the nozzles for use and the nozzles not for use in the overlap portion OL of the line head 200. The nozzle for use means that the nozzle hole 201 where the discharge of the droplet is not prohibited, and the nozzle not for use means that the nozzle hole 201 where the discharge of the droplet is prohibited. In the present embodiment, a storage device of the control unit 500 stores a mask pattern for each of the heads 210 to 240. As represented in FIG. 3, the mask pattern is set such that the nozzle for use and the nozzle not for use are alternately arranged along the Y direction. As described above, in FIG. 3, the nozzles for use are represented by the solid lines, and the nozzles not for use are represented by the broken lines. In addition to the information described above, the shaping data represents an amount of powder to be supplied to the shaping tank unit 30 by the powder layer forming unit 110, a temperature of the heater of the curing energy supply unit 130, and the like.

With reference to FIG. 4, in step S125, the control unit 500 performs a processing of setting shaped object identification information for identifying the three-dimensional shaped object OB to be shaped and nozzle identification information for identifying the nozzle hole 201. This step is also referred to as an identification information setting step. Specifically, first, the control unit 500 sets the shaped object identification information for each three-dimensional shaped object OB, and sets the nozzle identification information for each nozzle hole 201. Next, the control unit 500 associates the shaped object identification information with the nozzle identification information for identifying the nozzle hole 201 used for shaping the three-dimensional shaped object OB identified by the shaped object identification information, and stores the information into the storage device of the control unit 500.

In the present embodiment, the nozzle identification information for identifying the nozzle hole 201 is previously set in the control unit 500. As represented in FIG. 3, the nozzle identification information is set using a character "N" and a number representing the number of the nozzle hole 201 from the end portion of the line head 200 on the −Y direction side. In the present embodiment, the first head 210 is provided with 300 nozzle holes 201. The nozzle holes 201 are identified by setting the nozzle identification information up to "N300" in an order of "N1," "N2," and "N3" from the end portion on the −Y direction side. The second head 220 is provided with 300 nozzle holes 201. In the nozzle holes 201 of the second head 220, the nozzle identification information up to "N600" is set in an order of "N301", "N302", and "N303" from the end portion on the −Y direction side. The nozzle identification information is set for nozzle holes 201 of the third head 230 and nozzle holes 201 of the fourth head 240 in accordance with rules described above.

As represented in FIGS. 5 and 6, in the present embodiment, the control unit 500 sets the shaped object identification information using information related to the arrangement of the three-dimensional shaped objects OBs to be shaped. More specifically, the control unit 500 sets shaped object identification information "Mijk" to the three-dimensional shaped object OB in an i-th layer, a j-th row, and a k-th column. For example, shaped object identification information "M111" is set to a three-dimensional shaped object OB in a first layer, a first row, and a first column. Since a three-dimensional shaped object OB adjacent to the three-dimensional shaped object OB represented by the shaped object identification information "M111" in a +X direction is a three-dimensional shaped object OB in the first layer, a second row, and the first column, shaped object identification information "M121" is set. Since a three-dimensional shaped object OB adjacent to the three-dimensional shaped object OB represented by the shaped object identification information "M121" in a +Z direction is a three-dimensional shaped object OB in a second layer, the second row, and the first column, shaped object identification information "M221" is set.

In the present embodiment, for example, the three-dimensional shaped objects OBs represented by shaped object identification information "M111", "M121", "M131", "M141", "M211", "M221", "M231", "M241", "M311", "M321", "M331", "M341", "M411", "M421", "M431", "M441", "M511", "M521", "M531", and "M541" are shaped using nozzle holes 201 represented by nozzle identification information "N50" to nozzle holes 201 represented by "N250". Therefore, the shaped object identification information "M111", "M121", "M131", "M141", "M211", "M221", "M231", "M241", "M311", "M321", "M331", "M341", "M411", "M421", "M431", "M441", "M511", "M521", "M531", and "M541" and the nozzle identification information "N50" to "N250" are associated with each other and stored in the storage device of the control unit 500.

With reference to FIG. 4, in step S130, the control unit 500 sets a timing for performing a discharge inspection to inspect the discharge state of the droplet from the nozzle hole 201 using the discharge inspection unit 80. This step is also referred to as a discharge inspection timing setting step. The timing for performing the discharge inspection is specified by the user, for example. In the present embodiment, the discharge inspection is performed in three stages. First, as a first stage, a discharge inspection is performed before the start of a shaping step described later. Next, as a second stage, the discharge inspection is performed during the shaping step. Further, as a third stage, the discharge inspection is performed after the shaping step. In the present embodiment, regarding the discharge inspection in the second stage, a timing for performing the discharge inspection is set such that the discharge inspection is performed from an end of shaping three-dimensional shaped objects OBs of one layer to a start of shaping three-dimensional shaped objects OBs of the next layer. Therefore, for example, the discharge inspection is performed from an end of shaping three-dimensional shaped objects OBs of the first layer represented by shaped object identification information "M111" to "M144" to a start of shaping three-dimensional shaped objects OBs of the second layer represented by shaped object identification information "M211" to "M244".

In step S135, as described above, the control unit 500 performs the discharge inspection before the shaping step. The control unit 500 performs the discharge inspection using the discharge inspection unit 80. This step is also referred to as a preliminary discharge inspection step. The control unit 500 performs the discharge inspection by discharging a predetermined amount of droplets from the nozzle holes 201 of the line head 200 in a state where the shaping unit 100 is disposed at the home position HP. Since the head cap 91 is disposed below the line head 200, the droplets discharged from the nozzle holes 201 are collected by the head cap 91 and stored in the waste liquid tank 96. A result of the discharge inspection acquired from the discharge inspection unit 80 is stored in the storage device of the control unit 500.

In step S140, the control unit 500 determines whether there is an abnormality in the discharge state of the droplets from nozzle holes 201 used for shaping. This step is also referred to as a discharge abnormality determination step. The control unit 500 can determine whether there is an abnormality in the discharge state of the droplets from the nozzle holes 201 using the result of the discharge inspection in step S135. In the present embodiment, when there is an abnormality in the discharge state from at least one nozzle hole 201, the control unit 500 determines that the discharge state of the droplets from the nozzle holes 201 is abnormal.

When it is determined that there is no abnormality in step S140, the control unit 500 starts the shaping step in step S200. On the other hand, when it is determined that there is an abnormality in step S140, in step S145, the control unit 500 uses the suction unit 90 to recover the discharge state. Specifically, the control unit 500 controls the cap lifting mechanism 92 to cover the surface of the line head 200 where the nozzle holes 201 are provided with the head cap 91, and controls the suction pump 95 to suck the liquid from the nozzle holes 201.

In step S150, the control unit 500 determines whether to start the shaping step using the result of the discharge inspection in the preliminary discharge inspection step. This step is also referred to as a start determination step. In the present embodiment, the control unit 500 calculates an assumed yield, assuming that the three-dimensional shaped object OB shaped using the nozzle hole 201 in which the abnormality of the discharge state is detected is a low-quality three-dimensional shaped object, and when the calculated assumed yield is equal to or more than a predetermined ratio, determines to start the shaping step. The assumed yield is calculated by dividing the number of three-dimensional shaped objects OBs assumed to below-quality three-dimensional shaped objects by the number of three-dimensional shaped objects OBs scheduled for shaping. The control unit 500 may display the calculated assumed yield on, for example, a display unit of the information processing device 20, and determine whether to start the shaping step according to an instruction from the user. In this case, the user can determine whether to start the shaping step with reference to the assumed yield displayed on the display unit of the information processing device 20.

When it is determined not to start the shaping step in step S150, the control unit 500 ends this processing without performing the shaping step. On the other hand, when it is determined to start the shaping step in step S150, the control unit 500 starts the shaping step in step S200.

Figure 7:
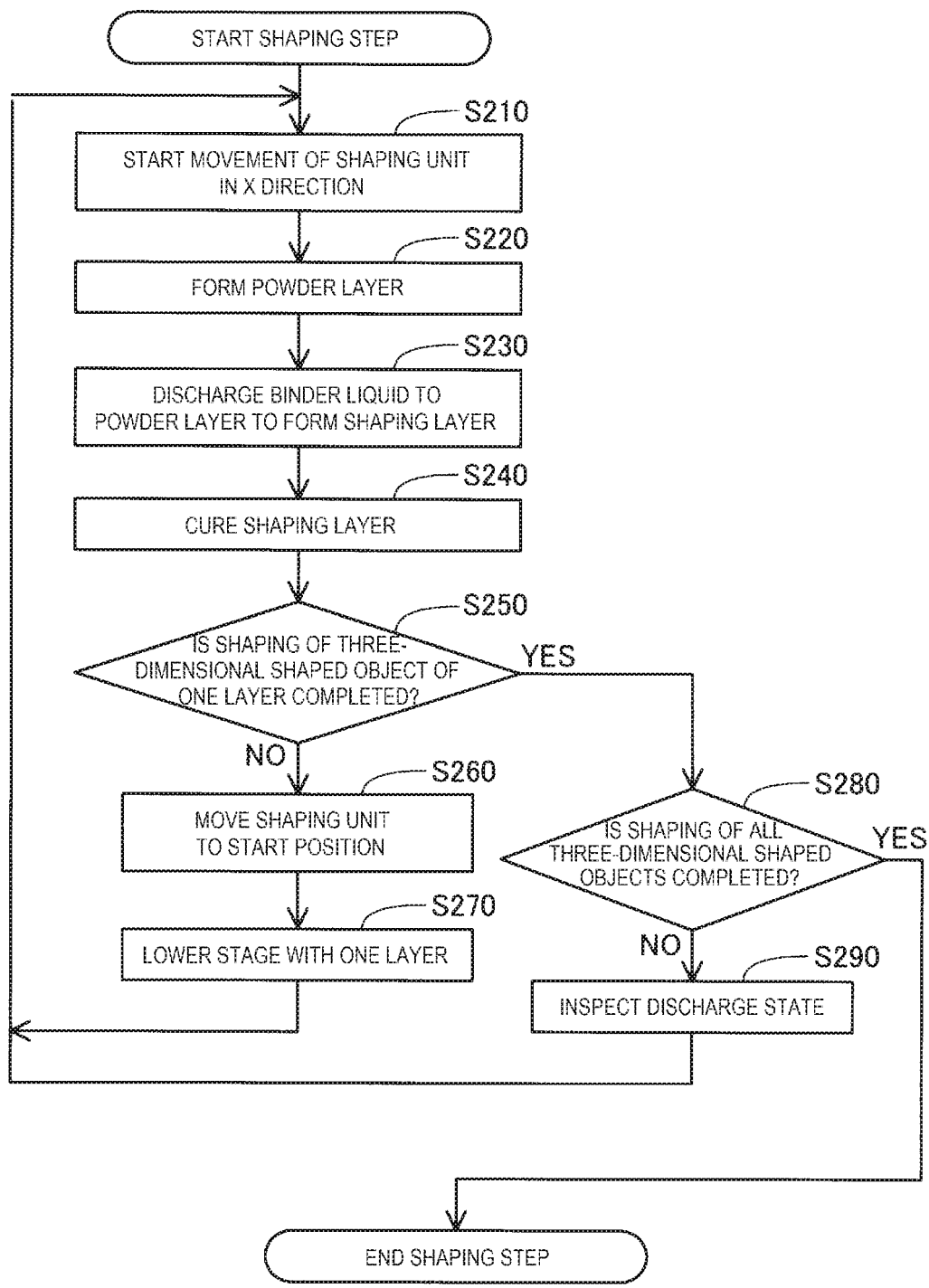
FIG. 7 is a flowchart showing contents of a shaping step according to the first embodiment.

FIG. 7 is a flowchart showing contents of the shaping step according to the present embodiment. First, in step S210, the control unit 500 controls the moving mechanism 50 to start the movement of the shaping unit 100. In the present embodiment, the control unit 500 moves the shaping unit 100 from the +X direction side to a −X direction side in FIG. 2.

Next, in step S220, the control unit 500 controls the powder layer forming unit 110 of the shaping unit 100 to form a powder layer on the stage 31. In step S230, the control unit 500 controls the discharge unit 120 of the shaping unit 100 to discharge droplets of the binder liquid to the powder layer to form a shaped layer. In step S240, the control unit 500 controls the curing energy supply unit 130 of the shaping unit 100 to cure the binder contained in the binder liquid. By steps S210 to S240, one shaped layer is shaped while the shaping unit 100 moves above the stage 31 from a right end to a left end.

Thereafter, in step S250, the control unit 500 determines whether shaping a three-dimensional shaped object OB of one layer is completed. The control unit 500 can determine whether shaping the three-dimensional shaped object OB of one layer is completed using the shaping data. In step S250, when it is determined that shaping the three-dimensional shaped object OB of one layer is not completed, in step S260, the control unit 500 controls the moving mechanism 50 to move the shaping unit 100 from an end portion of the stage 31 on the −X direction side to an end portion of the stage 31 on the +X direction side in FIG. 2. In step S270, the control unit 500 controls the lifting mechanism 33 to lower the stage 31 over the same distance as a thickness of the shaped layer. Thereafter, the control unit 500 returns a processing to step S210 to shape one more shaped layer on the shaped layer.

On the other hand, when it is determined that shaping the three-dimensional shaped object OB of one layer is completed in step S250, in step S280, the control unit 500 determines whether shaping all three-dimensional shaped objects OBs is completed. In step S280, when it is determined that shaping all three-dimensional shaped objects OBs is not completed, in step S290, the control unit 500 controls the moving mechanism 50 to move the shaping unit 100 to the home position HP, and performs a discharge inspection by discharging a predetermined amount of droplets from the nozzle holes 201 of the line head 200. This step is also referred to as a discharge inspection step. That is, in the present embodiment, the discharge inspection step is performed during the shaping step. Since the head cap 91 is disposed below the line head 200, the droplets discharged from the nozzle holes 201 are collected by the head cap 91 and stored in the waste liquid tank 96. A result of the discharge inspection acquired from the discharge inspection unit 80 is stored in the storage device of the control unit 500. The result of the discharge inspection includes the nozzle identification information of the nozzle hole 201 in which the abnormality is detected. When an abnormality is detected in the discharge state in the discharge inspection step, the control unit 500 continues, in a subsequent shaping step, the shaping step while stopping shaping the three-dimensional shaped object OB performed using the nozzle hole 201 in which the abnormality is detected. On the other hand, when it is determined that shaping all three-dimensional shaped objects OBs is completed in step S280, the shaping step is ended.

With reference to FIG. 4, after the shaping step in step S200, in step S155, the control unit 500 controls the moving mechanism 50 to move the shaping unit 100 to the home position HP, and performs a discharge inspection by discharging a predetermined amount of droplets from the nozzle holes 201 of the line head 200. This step is also referred to as a discharge inspection step, and may also be referred to as a post discharge inspection step. That is, in the present embodiment, the discharge inspection step is also performed after the shaping step. Since the head cap 91 is disposed below the line head 200, the droplets discharged from the nozzle holes 201 are collected by the head cap 91 and stored in the waste liquid tank 96. A result of the discharge inspection acquired from the discharge inspection unit 80 is stored in the storage device of the control unit 500. The result of the discharge inspection includes the nozzle identification information of the nozzle hole 201 in which the abnormality is detected.

Thereafter, in step S160, the control unit 500 determines whether the shaped three-dimensional shaped object OB includes a low-quality three-dimensional shaped object. This step is also referred to as a quality determination step. When an abnormality is detected in the discharge state of the droplets from the nozzle hole 201, for example, there is a possibility that voids are generated in the shaped three-dimensional shaped object OB without the intended droplets being discharged from the nozzle hole 201. Therefore, in the discharge inspection step in step S290 of FIG. 7, or in the discharge inspection in the discharge inspection step in step S155 of FIG. 4, when an abnormality is detected in the discharge state from at least one of a plurality of nozzle holes 201, the control unit 500 determines that a low-quality three-dimensional shaped object is included in a plurality of shaped three-dimensional shaped objects OBs.

In the present embodiment, the control unit 500 stores the shaped object identification information in association with the nozzle identification information. The control unit 500 stores the nozzle identification information of the nozzle hole 201 in which the abnormality is detected. Therefore, in the quality determination step in step S160, the control unit 500 can use the shaped object identification information and the nozzle identification information to calculate the number of three-dimensional shaped objects that are not of low quality, in other words, the number of non-defective products, and can specify identification information of the low-quality three-dimensional shaped object. For example, when in a discharge inspection performed after shaping a three-dimensional shaped object OB of a fourth layer is completed, no abnormality is detected in the discharge state of the droplets from the nozzle hole 201, and in a discharge inspection performed after shaping a three-dimensional structure OB of a fifth layer is completed, an abnormality is detected in the discharge state of the droplets from the nozzle hole 201 represented by nozzle identification information "N100", since the nozzle hole 201 represented by the nozzle identification information "N100" in which the abnormality is detected is used for shaping, three-dimensional shaped objects OBs represented by the shaped object identification information "M511", "M521", "M531", and "M541" among three-dimensional shaped objects OBs of the fifth layer are determined to be low-quality three-dimensional shaped objects OBs. The control unit 500 subtracts 4 which is the number of the low-quality three-dimensional shaped objects OBs from 80 which is the number of the three-dimensional shaped objects OBs scheduled for shaping to obtain 76 as the number of non-defective products. In the present embodiment, the control unit 500 displays a determination result regarding qualities of the three-dimensional shaped objects OBs on the display unit of the information processing device 20.

Figure 8:
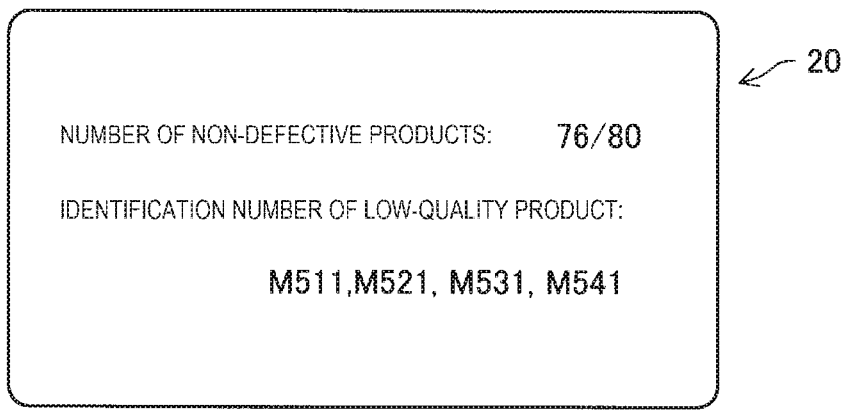
FIG. 8 is a diagram showing an example of a determination result regarding qualities of the three-dimensional shaped objects.

FIG. 8 is a diagram showing an example of the determination result regarding qualities of three-dimensional shaped objects OBs. In the present embodiment, the number of non-defective products, a total number of the shaped three-dimensional shaped objects OBs, and the shaped object identification information of the three-dimensional shaped objects OBs determined to be low-quality three-dimensional shaped objects are displayed. In the example shown in FIG. 8, the number of non-defective products 76 out of 80 which is the total number of the three-dimensional shaped objects OBs scheduled for shaping, and four three-dimensional shaped objects OBs represented by the shaped object identification information "M511", "M521", "M531", and "M541" being the low-quality three-dimensional shaped objects OBs are displayed.

According to the three-dimensional shaping device 10 of the present embodiment described above, the control unit 500 inspects the discharge state of the droplets from the nozzle hole 201 after and during the shaping step, and uses the results of the inspections to determine whether a low-quality three-dimensional shaped object is included in the plurality of the three-dimensional shaped objects shaped in the shaping step. Therefore, it is possible to easily determine whether a low-quality three-dimensional shaped object is included in the plurality of the three-dimensional shaped objects, so that the time and effort for the determination can be reduced. In particular, in the present embodiment, since the control unit 500 stores the shaped object identification information in association with the nozzle identification information, a low-quality three-dimensional shaped object shaped using the abnormal nozzle hole 201 can be specified from the plurality of shaped three-dimensional shaped objects.

In the present embodiment, the control unit 500 performs the preliminary discharge inspection step before the shaping step, and when an abnormality is detected in the discharge state of the droplets from the nozzle hole 201, the control unit 500 can cancel the start of the shaping step. Therefore, it is possible to previously prevent a low-quality three-dimensional shaped object from being shaped in the shaping step.

In the present embodiment, when an abnormality is detected in the discharge state of the droplets from the nozzle hole 201, the control unit 500 controls the suction unit 90 to discharge the liquid from the nozzle hole 201, and performs a discharge recovery step of recovering from an abnormality of the discharge state of the droplet from the nozzle hole 201. Therefore, since the abnormality can be eliminated even when the abnormality is detected in the discharge state of the droplets from the nozzle hole 201, it is possible to prevent the low-quality three-dimensional shaped object from being continuously shaped using the nozzle hole 201 in which the abnormality is detected.

In the present embodiment, when an abnormality is detected in the discharge state of the droplets from the nozzle hole 201 during the shaping step, the control unit 500 stops, in a subsequent shaping step, shaping the three-dimensional shaped object scheduled for shaping using the nozzle hole 201 in which the abnormality is detected. Therefore, it is possible to prevent wasteful consumption of liquid caused by continuing to shape a low-quality three-dimensional shaped object using the nozzle hole 201 in which no abnormality is detected.

In the present embodiment, a timing of the discharge inspection is set such that the discharge inspection is performed from an end of shaping the three-dimensional shaped objects of one layer to a start of shaping the three-dimensional shaped objects of the next layer. Therefore, it is possible to prevent a prolonged shaping step due to the discharge inspection step while appropriately securing a frequency at which the discharge inspection step is performed.

In the present embodiment, the powdery stainless steel is used as the powder, whereas as described above, as materials used as the powder, for example, various materials such as the metal material, the ceramic material, the resin material, the composite material, wood, rubber, leather, carbon, glass, the biocompatible material, the magnetic material, gypsum, and sand can be used. As the powder, it is preferable to use a metal material or a ceramic material that can be subjected to a sintering processing after the three-dimensional shaped object is shaped. This is because a mechanical strength of the three-dimensional shaped object can be improved by the sintering processing.

As the metal material, a steel material may be used, or a non-ferrous metal material may be used. An alloy may be used as the metal material. One type of metal material may be used, or two or more types of metal materials may be used in combination. The metal material may be coated with, for example, a thermoplastic resin described later or another thermoplastic resin. Examples of the metal material are shown below. The metal materials shown below are merely examples, and the present disclosure is not limited thereto, and various metal materials can be used.

Example of Metal Material

Single metals such as magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), palladium (Pd), silver (Ag), indium (In), tin (Sn), tantalum (Ta), tungsten (W) or neodymium (Nd), or an alloy containing one or more of these metals Example of Alloy Maraging steel, stainless steel, cobalt chrome molybdenum, titanium alloy, nickel alloy, aluminum alloy, cobalt alloy, and cobalt chromium alloy As the ceramic material, hydroxide ceramic may be used, or non-hydroxide ceramic may be used. One type of ceramic material may be used, or two or more types of ceramic materials may be used in combination. The ceramic material may be coated with, for example, a thermoplastic resin described later, or another thermoplastic resin. Examples of the ceramic material are shown below. The ceramic materials shown below are merely examples, and the present disclosure is not limited thereto, and various ceramic materials can be used.

Example of Ceramic Material

Oxide ceramics such as silicon dioxide, titanium dioxide, aluminum oxide, and zirconium oxide, and non-oxide ceramics such as aluminum nitride, silicon nitride and silicon carbide As the resin material, a thermoplastic resin may be used, or a thermosetting resin may be used. One type of resin material may be used, or two or more types of resin materials may be used in combination. Examples of the resin material are shown below. The resin materials shown below are merely examples, and the present disclosure is not limited thereto, and various resin materials can be used.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and special engineering plastics such as polysulfone, polyethersulfone, polyphenylene sulfide, polyarylate, polyimide, polyamideimide, polyetherimide, and polyetheretherketone (PEEK)

Example of Thermosetting Resin Material

A phenol resin (PF), an epoxy resin (EP), a melamine resin (MF), a urea resin (UF), an unsaturated polyester resin (UP), an alkyd resin, polyurethane (PUR), and thermosetting polyimide (PI)

Examples of the binder liquid include a solvent, various colorants such as pigments and dyes, a dispersant, a surfactant, a polymerization initiator, a polymerization accelerator, a penetration enhancer, a wetting agent (humectant), a fixing agent, a fungicide, a preservative, an antioxidant, an ultraviolet absorber, a chelating agent, a pH adjuster, a thickener, a filler, an anti-agglomeration agent, and a defoamer.

Example of Solvent

Water, alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, and alcohols such as ethanol, propanol, and butanol. One type of the solvents may be used as the solvent, or two or more types may be used in combination as the solvent B. Other Embodiments (B1) In the quality determination method of the above-described embodiment, the preliminary discharge inspection step is performed. On the contrary, in the quality determination method, the preliminary discharge inspection step may not be performed. In this case, step S200 may be performed after step S130 without performing the processing from step S135 to step S150 in FIG. 4.

(B2) In the quality determination method of the above-described embodiment, the control unit 500 stores the shaped object identification information in association with the nozzle identification information for identifying the nozzle hole 201 used for shaping the three-dimensional shaped object OB identified by the shaped object identification information. On the contrary, the control unit 500 does not have to store the shaped object identification information in association with the nozzle identification information identifying the nozzle hole 201 used for shaping the three-dimensional shaped object OB identified by the shaped object identification information. Even in this case, the control unit 500 can determine whether the low-quality three-dimensional shaped object OB is included in the plurality of shaped three-dimensional shaped objects OBs.

(B3) In the quality determination method of the above-described embodiment, when an abnormality in the discharge state is detected in the discharge inspection step performed during the shaping step, the control unit 500 continues, in the subsequent shaping step, the shaping step while stopping shaping the three-dimensional shaped object OB performed using the nozzle hole 201 in which the abnormality is detected. On the contrary, even when the abnormality in the discharge state is detected in the discharge inspection step, the control unit 500 does not have to stop shaping the three-dimensional shaped object OB performed using the nozzle hole 201 in which the abnormality is detected.

(B4) In the quality determination method of the above-described embodiment, when an abnormality in the discharge state is detected in the discharge inspection step performed during the shaping step, the control unit 500 may control the suction unit 90 for recovery from an abnormality in the discharge state. When the abnormality of the discharge state is eliminated, the number of non-defective products to be shaped can be increased. The control unit 500 may control the suction unit 90 for recovery from the abnormality in the discharge state, perform the discharge inspection step again, and then restart shaping the three-dimensional shaped object OB.

(B5) In the quality determination method of the above-described embodiment, the timing of the discharge inspection performed during the shaping step in the same layer may be set during a period from an end of shaping three-dimensional shaped objects OBs of one row to a start of shaping three-dimensional shaped objects OBs of the next row. Therefore, for example, the discharge inspection is performed from an end of shaping three-dimensional shaped objects OBs of the first row of the first layer represented by shaped object identification information "M111" to "M114" to a start of shaping three-dimensional shaped objects OBs of the second row of the first layer represented by shaped object identification information "M121" to "M124". In this case, the control unit 500 may, for example, discharge droplets from the nozzle holes 201 toward, on the powder layer, a region between a region where the three-dimensional shaped objects OBs of the first row are shaped and a region where the three-dimensional shaped objects OBs of the second row are shaped, and may perform a discharge inspection.

(B6) In the quality determination method of the above-described embodiment, the timing of the discharge inspection performed during the shaping step may be set such that the discharge inspection is performed from an end of shaping three-dimensional shaped objects OBs of a plurality of layers to a start of shaping three-dimensional shaped objects OBs of the next layer. For example, the discharge inspection may not be performed from the end of shaping the three-dimensional shaped objects OBs of the first layer represented by the shaped object identification information "M111" to "M144" to the start of shaping the three-dimensional shaped objects OBs of the second layer represented by the shaped object identification information "M211" to "M244", but performed from an end of shaping the three-dimensional shaped objects OBs of the second layer represented by the shaped object identification information "M211" to "M244" to a start of shaping three-dimensional shaped objects OBs of a third layer represented by shaped object identification information "M311" to "M344".

(B7) In the quality determination method of the above-described embodiment, the timing of the discharge inspection performed during the shaping step may be set such that a cycle at which the discharge inspection is performed does not exceed a cycle stored previously in the control unit 500. If a discharge cycle from the discharge of the droplets from the nozzle hole 201 to the next discharge of the droplets from the same nozzle hole 201 becomes longer, the liquid is likely to be thickened in the nozzle hole 201, and the nozzle hole 201 is likely to be clogged. Therefore, a timing at which the discharge inspection is performed may be set such that the cycle at which the discharge inspection is performed is shorter than the discharge cycle at which the nozzle hole 201 is likely to be clogged. The discharge cycle at which the nozzle hole 201 is likely to be clogged can be checked by a test performed previously.

(B8) The three-dimensional shaping device 10 of the above-described embodiment shapes one shaped layer on the stage 31 while the shaping unit 100 reciprocates once above the stage 31 along the X direction. On the contrary, the three-dimensional shaping device 10 may be configured to shape two shaped layers on the stage 31 while the shaping unit 100 reciprocates once above the stage 31 along the X direction. For example, in the shaping unit 100 represented in FIG. 1, on aright side of the discharge unit 120, a powder layer forming unit 110 is further provided, and on a left side of the discharge unit 120, a curing energy supply unit 130 is further provided, so that while the shaping unit 100 reciprocates once above the stage 31 along the X direction, two shaped layers can be shaped on the stage 31.

(B9) The three-dimensional shaping device 10 of the above-described embodiment is of a binder injection type in which droplets of the binder liquid are discharged from the nozzle hole 201 to shape the three-dimensional shaped object. On the contrary, the three-dimensional shaping device 10 may be of a material injection type in which droplets of a shaping liquid are discharged from the nozzle hole 201 to shape the three-dimensional shaped object. The shaping liquid means a liquid containing a material of the three-dimensional shaped object. As a material contained in the shaping liquid, for example, various materials such as a particulate metal material, a ceramic material, and a resin material can be used. In this case, the shaping unit 100 may not be provided with the powder layer forming unit 110.

As a metal material contained in the shaping liquid, a steel material may be used, or a non-ferrous metal material may be used. An alloy may be used as the metal material. One type of metal material may be used, or two or more types of metal materials may be used in combination. The metal material may be coated with, for example, a thermoplastic resin described later or another thermoplastic resin. Examples of the metal material are shown below. The metal materials shown below are merely examples, and the present disclosure is not limited thereto, and various metal materials can be used.

Example of Metal Material

Single metals such as magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), palladium (Pd), silver (Ag), indium (In), tin (Sn), tantalum (Ta), tungsten (W) or neodymium (Nd), or an alloy containing one or more of these metals Example of Alloy Maraging steel, stainless steel, cobalt chrome molybdenum, titanium alloy, nickel alloy, aluminum alloy, cobalt alloy, and cobalt chromium alloy As a ceramic material contained in the shaping liquid, hydroxide ceramic may be used, or non-hydroxide ceramic may be used. One type of ceramic material may be used, or two or more types of ceramic materials may be used in combination. The ceramic material may be coated with, for example, a thermoplastic resin described later, or another thermoplastic resin. Examples of the ceramic material are shown below. The ceramic materials shown below are merely examples, and the present disclosure is not limited thereto, and various ceramic materials can be used.

Example of Ceramic Material

Oxide ceramics such as silicon dioxide, titanium dioxide, aluminum oxide, and zirconium oxide, and non-oxide ceramics such as aluminum nitride, silicon nitride and silicon carbide As a resin material contained in the shaping liquid, a thermoplastic resin may be used, or a thermosetting resin may be used. One type of resin material may be used, or two or more types of resin materials may be used in combination. Examples of the resin material are shown below. The resin materials shown below are merely examples, and the present disclosure is not limited thereto, and various resin materials can be used.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and special engineering plastics such as polysulfone, polyethersulfone, polyphenylene sulfide, polyarylate, polyimide, polyamideimide, polyetherimide, and polyetheretherketone (PEEK)

Example of Thermosetting Resin Material

A phenol resin (PF), an epoxy resin (EP), a melamine resin (MF), a urea resin (UF), an unsaturated polyester resin (UP), an alkyd resin, polyurethane (PUR), and thermosetting polyimide (PI)

Examples of the shaping liquid include a solvent, various colorants such as pigments and dyes, a dispersant, a surfactant, a polymerization initiator, a polymerization accelerator, a penetration enhancer, a wetting agent (humectant), a fixing agent, a fungicide, a preservative, an antioxidant, an ultraviolet absorber, a chelating agent, a pH adjuster, a thickener, a filler, an anti-agglomeration agent, and a defoamer.

Example of Solvent

Water, alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, and alcohols such as ethanol, propanol, and butanol. One type of the solvents may be used as the solvent, or two or more types may be used in combination as the solvent C. Other Aspects The present disclosure is not limited to the above-described embodiments, and can be implemented in various aspects without departing from the spirit of the present disclosure. For example, the present disclosure can be implemented by the following aspects. In order to solve some or all of the problems described in the present disclosure, or to achieve some or all of the effects of the present disclosure, technical characteristics in the above embodiments corresponding to the technical characteristics in each of the embodiments described below can be appropriately replaced or combined. If the technical characteristics are not described as essential in the present description, they can be deleted as appropriate.

(1) According to a first aspect of the present disclosure, a quality determination method for a three-dimensional shaped object is provided. The quality determination method for a three-dimensional shaped object includes: a shaping step of shaping a plurality of three-dimensional shaped objects by discharging a liquid from a nozzle hole toward a stage while changing a relative position between a discharge unit having a plurality of the nozzle holes arranged along a first direction and the stage in a second direction intersecting the first direction; a discharge inspection step of inspecting a discharge state of the liquid from the nozzle hole after or during the shaping step; and a quality determination step of determining that, when an abnormality is detected in the discharge state from at least one nozzle hole of the plurality of nozzle holes in the discharge inspection step, a low-quality three-dimensional shaped object is included in the plurality of shaped three-dimensional shaped objects.

According to the quality determination method for a three-dimensional shaped object in this aspect, using a result of an inspection of the discharge state of the liquid from the nozzle hole, it can be easily determined whether a low-quality three-dimensional shaped object is included in the plurality of shaped three-dimensional shaped objects. Therefore, the time and effort for determining whether a low-quality three-dimensional shaped object is included in the plurality of three-dimensional shaped objects can be reduced.

(2) The quality determination method for a three-dimensional shaped object according to the above aspect may further include, before the shaping step, a preliminary discharge inspection step of inspecting the discharge state from the nozzle hole; and a start determination step of determining whether to start the shaping step using a result of an inspection in the preliminary discharge inspection step.

According to the quality determination method for a three-dimensional shaped object in this aspect, it is possible to previously prevent a low-quality three-dimensional shaped object from being shaped.

(3) The quality determination method for a three-dimensional shaped object according to the above aspect may further include, a discharge recovery step of recovering, when an abnormality is detected in the discharge state from the nozzle hole in the discharge inspection step, the discharge state from the nozzle hole in which the abnormality is detected.

According to the quality determination method for a three-dimensional shaped object in this aspect, since the discharge state of the liquid from the nozzle hole can be returned to a normal state, it is possible to prevent the low-quality three-dimensional shaped object from being continuously shaped.

(4) In the quality determination method for a three-dimensional shaped object according to the above aspect, the discharge inspection step is performed during the shaping step, and when an abnormality is detected is the discharge state of the nozzle hole in the discharge inspection step, in the shaping step after the discharge inspection step, shaping the three-dimensional shaped object performed using the nozzle hole in which the abnormality is detected is stopped.

According to the quality determination method for a three-dimensional shaped object in this aspect, since shaping of the low-quality three-dimensional shaped object can be stopped, it is possible to prevent wasteful consumption of the liquid.

(5) The quality determination method for a three-dimensional shaped object according to the above aspect may further include: recording, before the discharge inspection step, shaped object identification information for identifying the three-dimensional shaped object in association with nozzle identification information for identifying the nozzle hole used for shaping the three-dimensional shaped object identified by the shaped object identification information; recording, when the abnormality is detected in the discharge state from the nozzle hole in the discharge inspection step, the nozzle identification information of the nozzle hole in which the abnormality is detected; and using, in the quality determination step, the shaped object identification information and the nozzle identification information to specify the low-quality three-dimensional shaped object from the plurality of shaped three-dimensional shaped objects.

According to the quality determination method for a three-dimensional shaped object in this aspect, the low-quality three-dimensional shaped object can be specified from the plurality of three-dimensional shaped objects.

(6) In the quality determination method for a three-dimensional shaped object according to the above aspect, in the shaping step, when shaping the plurality of three-dimensional shaped objects along a third direction intersecting the first direction and the second direction, the discharge inspection step is performed from an end of shaping one three-dimensional shaped object to a start of shaping another three-dimensional shaped object adjacent in the third direction.

According to the quality determination method for a three-dimensional shaped object in this aspect, it is possible to prevent a prolonged shaping step due to the discharge inspection step while appropriately securing a frequency at which the discharge inspection step is performed.

(7) According to a second aspect of the present disclosure, a three-dimensional shaping device is provided. This three-dimensional shaping device includes: a discharge unit including a plurality of nozzle holes arranged along a first direction, and configured to discharge a liquid from the nozzle holes toward a stage; a moving unit configured to change a relative position between the discharge unit and the stage in a second direction intersecting the first direction; a discharge inspection unit configured to inspect an abnormality of a discharge state of the liquid from the nozzle holes; and a control unit configured to control the discharge unit, the moving unit, and the discharge inspection unit, in which the control unit performs a shaping processing of shaping a plurality of three-dimensional shaped objects by controlling the moving unit to change the relative position, controlling the discharge unit to discharge the liquid from the nozzle holes; performs a discharge inspection processing of inspecting the discharge state from the nozzle holes by controlling the discharge inspection unit after or during the shaping processing; and performs a quality determination processing of determining that, when the abnormality is detected in the discharge state from at least one nozzle hole of the plurality of nozzle holes in the discharge inspection processing, a low-quality three-dimensional shaped object is included in the plurality of shaped three-dimensional shaped objects.

According to the three-dimensional shaping device, the control unit uses a result of the inspection of the discharge state of the liquid from the nozzle hole to determine whether a low-quality three-dimensional shaped object is included in the plurality of shaped three-dimensional shaped objects. Therefore, the time and effort for determining whether a low-quality three-dimensional shaped object is included in the plurality of three-dimensional shaped objects can be reduced.

The present disclosure can be implemented in various aspects other than the quality determination method for a three-dimensional shaped object. For example, the present disclosure can be implemented in the aspect of the three-dimensional shaping device, a method for controlling the three-dimensional shaping device, or a method for manufacturing the three-dimensional shaped object.

What is claimed is:

1. A quality determination method for a three-dimensional shaped object comprising:
    a shaping step of shaping a plurality of three-dimensional shaped objects by discharging a liquid binder from a nozzle hole toward a stage comprising powder build material while changing a relative position between a discharge unit having a plurality of the nozzle holes arranged along a first direction and the stage in a second direction intersecting the first direction;
    a discharge inspection step of inspecting a discharge state of the liquid binder from the nozzle hole after or during the shaping step;
    a quality determination step of determining that, when an abnormality is detected in the discharge state from at least one nozzle hole of the plurality of nozzle holes in the discharge inspection step, a low-quality three-dimensional shaped object is included in the plurality of shaped three-dimensional shaped objects;
    recording, before the discharge inspection step, shaped object identification information for identifying the three-dimensional shaped object in association with nozzle identification information for identifying the nozzle hole used for shaping the three-dimensional shaped object identified by the shaped object identification information;
    recording, when the abnormality is detected in the discharge state from the nozzle hole in the discharge inspection step, the nozzle identification information of the nozzle hole in which the abnormality is detected; and using, in the quality determination step, the shaped object identification information and the nozzle identification information to specify the low-quality three-dimensional shaped object from the plurality of shaped three-dimensional shaped objects;
    calculating a number of non-defective products as a number of three-dimensional shaped objects scheduled for the shaping step minus a number of the low-quality three-dimensional shaped objects; and
    based on the calculating, directing a 3D printer to adjust the shaping step and/or the discharge inspection step.

2. The quality determination method for a three-dimensional shaped object according to claim 1, further comprising:
    before the shaping step,
    a preliminary discharge inspection step of inspecting the discharge state from the nozzle hole; and
    a start determination step of determining whether to start the shaping step using a result of an inspection in the preliminary discharge inspection step.

3. The quality determination method for a three-dimensional shaped object according to claim 1, further comprising:
    a discharge recovery step of recovering, when the abnormality is detected in the discharge state from the nozzle hole in the discharge inspection step, the discharge state from the nozzle hole in which the abnormality is detected.

4. The quality determination method for a three-dimensional shaped object according to claim 1, wherein
    the discharge inspection step is performed during the shaping step, and
    when the abnormality is detected in the discharge state of the nozzle hole in the discharge inspection step, in the shaping step after the discharge inspection step, shaping the three-dimensional shaped object performed using the nozzle hole in which the abnormality is detected is stopped.

5. The quality determination method for a three-dimensional shaped object according to claim 1, wherein
    when shaping the plurality of three-dimensional shaped objects along a third direction intersecting the first direction and the second direction in the shaping step, the discharge inspection step is performed from an end of shaping one three-dimensional shaped object to a start of shaping another three-dimensional shaped object adjacent in the third direction.

6. A three-dimensional shaping device comprising:
a discharge unit including a plurality of nozzle holes arranged along a first direction, and configured to discharge a liquid binder from the nozzle holes toward a stage comprising a powder build material;
a moving unit configured to change a relative position between the discharge unit and the stage in a second direction intersecting the first direction;
a discharge inspection unit configured to inspect an abnormality of a discharge state of the liquid binder from the nozzle holes; and
a control unit configured to control the discharge unit, the moving unit, and the discharge inspection unit, wherein the control unit is programmed to be implemented by a computer including one or more processors, the program comprising instructions to
　perform a shaping processing of shaping a plurality of three-dimensional shaped objects by controlling the moving unit to change the relative position, and controlling the discharge unit to discharge the liquid from the nozzle holes;
perform a discharge inspection processing of inspecting the discharge state from the nozzle holes by controlling the discharge inspection unit after or during the shaping processing;
　performs a quality determination processing of determining that, when the abnormality is detected in the discharge state from at least one nozzle hole of the plurality of nozzle holes in the discharge inspection processing, a low-quality three-dimensional shaped object is included in the plurality of shaped three-dimensional shaped objects;
record, before the discharge inspection step, shaped object identification information for identifying the three-dimensional shaped object in association with nozzle identification information for identifying the nozzle hole used for shaping the three-dimensional shaped object identified by the shaped object identification information;
record, when the abnormality is detected in the discharge state from the nozzle hole in the discharge inspection step, the nozzle identification information of the nozzle hole in which the abnormality is detected; and using, in the quality determination step, the shaped object identification information and the nozzle identification information to specify the low-quality three-dimensional shaped object from the plurality of shaped three-dimensional shaped objects;
calculating a number of non-defective products as a number of three-dimensional shaped objects scheduled for the shaping step minus a number of the low-quality three-dimensional shaped objects; and
based on the calculating, directing the control unit to adjust the discharge unit, the moving unit, and/or the discharge inspection unit.

* * * * *